T. V. WASHBURN.
VEHICLE WHEEL.
APPLICATION FILED FEB. 25, 1920.
1,354,269.
Patented Sept. 28, 1920.
2 SHEETS—SHEET 1.
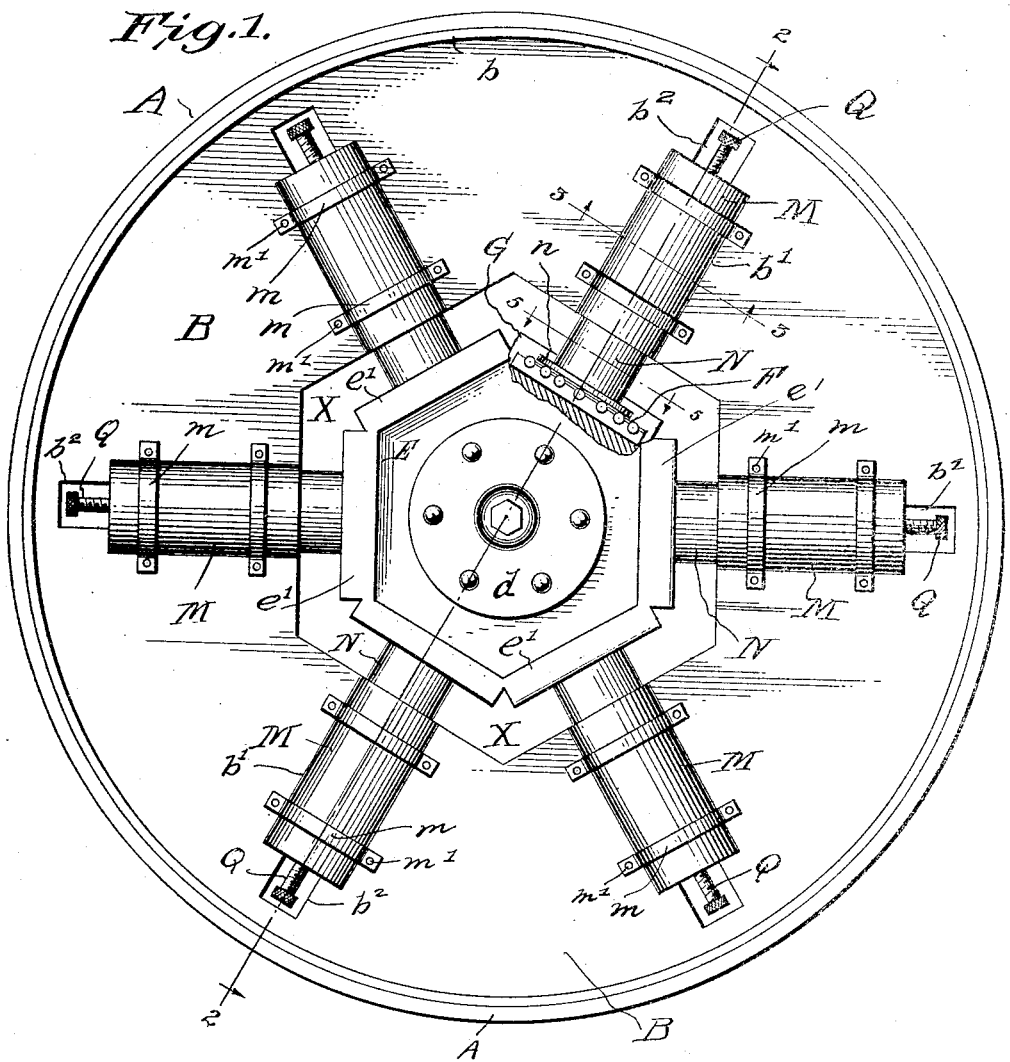
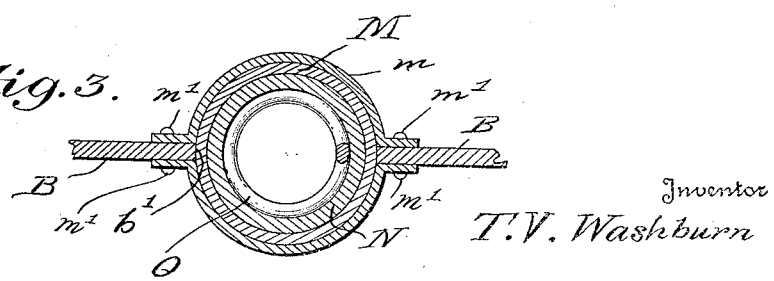
Inventor
T. V. Washburn
By his Attorneys T. V. WASHBURN.
VEHICLE WHEEL.
APPLICATION FILED FEB. 25, 1920.
1,354,269.
Patented Sept. 28, 1920.
2 SHEETS—SHEET 2.
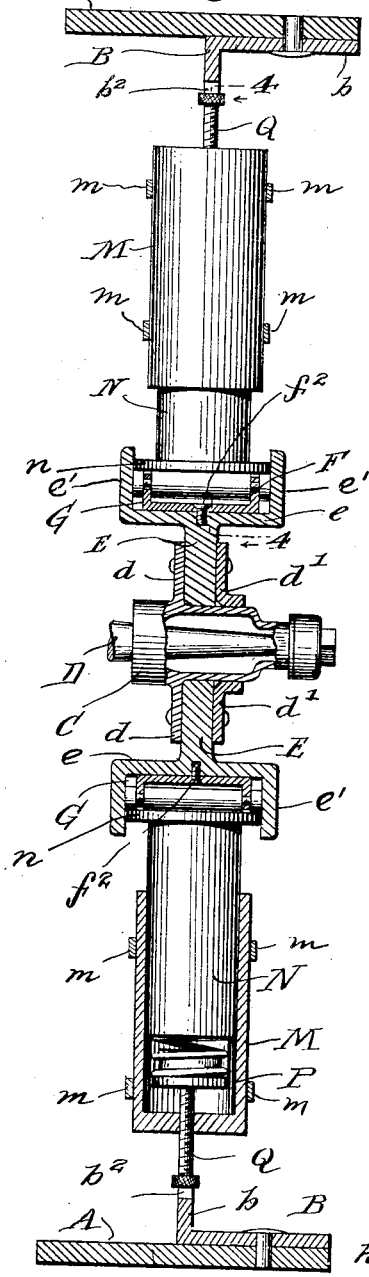
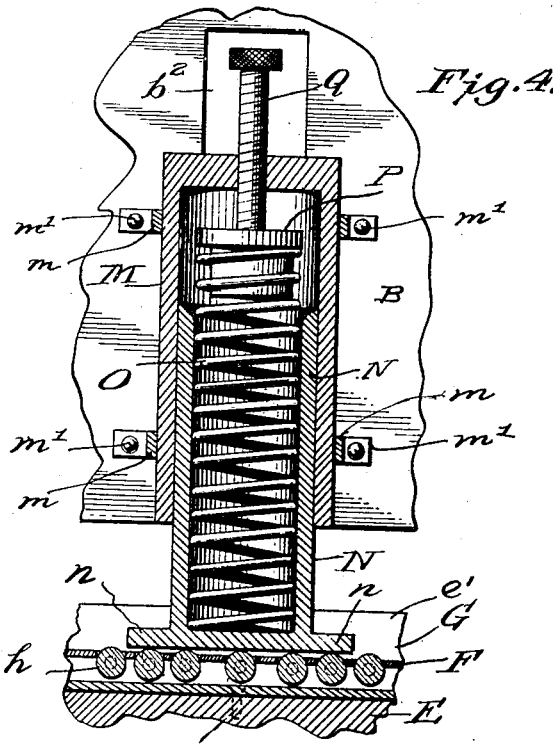
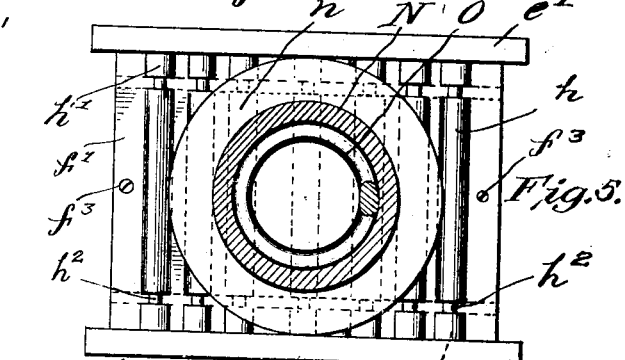
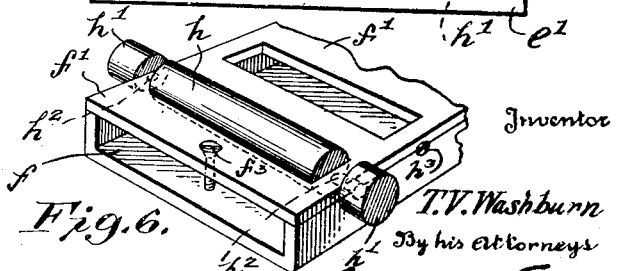

UNITED STATES PATENT OFFICE.

THOMAS VICTOR WASHBURN, OF CARBONDALE, PENNSYLVANIA, ASSIGNOR OF ONE-HALF TO PATRICK JOSEPH MURRAY, OF CARBONDALE, PENNSYLVANIA.

VEHICLE-WHEEL.

1,354,269.   Specification of Letters Patent.   Patented Sept. 28, 1920.

Application filed February 25, 1920. Serial No. 361,235.

*To all whom it may concern:*

Be it known that I, THOMAS VICTOR WASHBURN, a citizen of the United States, residing at Carbondale, in the county of Lackawanna and State of Pennsylvania, have invented certain new and useful Improvements in Vehicle-Wheels, of which the following is a specification.

This invention relates to vehicle wheels of the class in which the rim of the wheel is connected to the hub by spokes provided with compressible and expansible means whereby they may be extended or contracted in such manner as to provide a cushioning effect to absorb shocks and jars and thus render the wheel more easy in its movements.

According to my invention, I construct each spoke of two telescoping cylinders or tubes having expansible and contractible means within them, such as springs, and I connect one set of cylinders to the rim and the other set to the hub. Preferably the rim is carried by a web to which the cylinders are secured and which is provided with openings in which the cylinders are arranged. The hub of the wheel is of ordinary construction, but is provided with peripheral flanges carrying a polygonal connecting member which is interposed between the inner cylinders of the spokes and the hub. Preferably springs are arranged within the cylinders and these are placed under compression so as to tend to move the cylinders endwise in such manner as to elongate the spokes. The inner ends of the inner cylinders rest on rollers carried by the connecting member, the arrangement being such that when the spokes are shortened or elongated, the inner ends of the inner cylinders will move tangentially to the axis of the wheel.

In the accompanying drawings,

Figure 1 is a side elevation of a wheel embodying my improvements.

Fig. 2 shows a section on the line 2—2 of Fig. 1.

Fig. 3 shows a section on the line 3—3 of Fig. 1.

Fig. 4 is a view on an enlarged scale and in section showing more clearly the construction of the spokes and the manner in which they are supported.

Fig. 5 is an enlarged detail view showing particularly the construction of one of the roller bearings and how the inner member of a spoke is supported thereon.

Fig. 6 is a perspective view of a portion of a roller bearing.

The rim A of the wheel may be of any suitable construction. As shown, it has a plain metal tire and it is secured to the flange $b$ of a web B, which may be of wood, metal or any suitable material. The web B has a polygonal opening X and the web has a series of radial openings $b'$ to receive the spoke cylinders hereinafter described. The web also is formed with narrower openings $b^2$, for a purpose hereinafter explained. The hub C receives the axle D and this hub is provided with a fixed flange $d$ and a detachable flange $d'$. The polygonal member E for connecting the spokes with the hub comprises a web secured between the flanges $d, d'$ of the hub and having a widened chambered polygonal portion to receive roller bearings F. The roller bearing receiving chambers are each formed by extending the web laterally in opposite directions as indicated at $e$ and then bending them outward as indicated at $e'$, in Fig. 2.

As illustrating one form of my invention I have shown a polygonal connecting member E provided with six chambers for the roller bearings, but this number may be varied.

Within each chamber G I mount a roller bearing F. This is preferably of the construction shown in Fig. 6, comprising a box or cage consisting of a flanged inner member $f$ and a top plate or cover $f'$. The inner member $f$ is secured to the member E in the manner indicated at $f^2$ and the top plate is secured to the inner member in the manner shown at $f^3$. Each roller comprises a middle part $h$ and outer parts $h'$ connected by reduced portions $h^2$, which rest in recesses $h^3$ in the part $f$ and they are held in place by the top plate $f'$. Each spoke comprises an outer cylinder M and an inner cylinder N, having a flanged inner end $n$. Each outer cylinder is arranged in an opening $b'$ in the web B and it is secured to the web by straps $m$, attached to the web at $m'$. Each inner cylinder N telescopes with an outer cylinder and is adapted to slide therein. Within the cylinder N there is a spring O which bears on the closed inner end of the cylinder N and it also bears on a cap shaped head P, arranged in the outer portion of the cylinder M. The outer end of each cylinder M is closed but it has a threaded opening through which extends an adjusting screw Q operating in the opening $b^2$ and bearing against the head P. By means of this screw the tension of the spring may be varied.

I have indicated in the drawings six sets of spoke cylinders and devices associated therewith, but this number may be varied and while I have illustrated coil springs within the cylinders their equivalents may be employed.

The inner end of each cylinder N bears on the rollers $h$, $h'$, and thus an easy sliding movement is effected when necessary.

Fig. 1 illustrates the normal condition of the spokes but when the wheel sustains weight the spokes of the lower part of the wheel are shortened and the spokes of the upper part elongated, as usual in this class of wheels. Furthermore, when passing over obstructions or irregularities in the road the same effect is produced. When the length of the spokes is changed the longitudinal central axis of each spoke shifts laterally relatively to their normal positions and the inner flanged ends of the inner cylinders slide on the roller bearings. In this way undue strains are prevented and an easy movement is afforded between the various members which make up the wheel as a whole.

A wheel made in accordance with my invention is simple in construction and is very durable. As before stated, the rim of the wheel may be entirely metallic or it may be otherwise constructed. There is of course no danger of puncture and it is obvious that shocks and jars will to a very large degree be eliminated, or so reduced as to make the use of the wheel more easy and efficient.

I claim as my invention:

1. A vehicle wheel comprising a rim, a hub, a connecting member secured to the hub and having a polygonal series of chambers on its outer edge, a series of rollers arranged in each chamber tangentially with reference to the hub, and spokes connecting the rim with the connecting member comprising an outer series of cylinders connected with the rim, an inner series of cylinders telescoping with the outer series and which bear against the rollers carried by the connecting member, and cushioning means within the cylinders.

2. A vehicle wheel comprising a rim, a hub, a connecting member secured to the hub and having a chambered periphery, roller bearings arranged in said chambers and comprising a series of rollers in each chamber arranged tangentially with reference to the hub, and spokes connecting the rim with the connecting member comprising an outer set of cylinders rigidly connected with the rim, an inner set of cylinders telescoping with those first mentioned and which bear at their inner ends on the roller bearings, and cushioning means within the cylinders.

3. A vehicle wheel comprising a rim, a wheel web rigidly secured thereto and having a series of radial openings, a series of cylinders arranged in said openings and rigidly attached to the web, a connecting member rigidly attached to the hub, and which is chambered on its outer edge, roller bearings arranged in said chambers comprising in each chamber a plurality of rollers arranged in a tangential series with reference to the axis of the hub, a series of cylinders telescoping with those first mentioned and bearing at their inner ends on the roller bearings, and cushioning means within the cylinders.

4. A vehicle wheel comprising a rim, a web rigidly secured thereto and having radially exposed openings, a hub, a connecting member secured to the hub, and having roller bearing chambers in its outer edge, roller bearings arranged in said chambers comprising in each chamber a plurality of rollers arranged tangentially with reference to the axis of the hub, cylinders arranged in the openings on the web and rigidly secured to the web, cylinders telescoping with those first mentioned and having enlarged inner ends which rest on the roller bearings in the connecting member, springs in the cylinders and adjusting screws bearing on the springs and arranged in openings on the web.

In testimony whereof, I have hereunto subscribed my name.

THOMAS VICTOR WASHBURN.